Patented Apr. 12, 1932

1,854,061

UNITED STATES PATENT OFFICE

PIERRE GUSTAVE MARIE ADOLPHE PIGACHE, OF PARIS, FRANCE

METHOD FOR DECOHERING SOLID SUBSTANCES

No Drawing. Application filed June 23, 1928, Serial No. 287,899, and in France June 27, 1927.

The present invention has for its primary object to provide a method for decohering solid substances whereby it becomes possible to divide and disintegrate them to an extremely finely powdered state adapted to give rise by a dispersive or dispelling process in non-soluble or substantially non-soluble media to colloidal solutions.

A further object of the invention is to provide a decohering method that can be applied to a large number of bodies, materials or substances, for example to pigments or colors which thus acquire a considerable covering and tinctorial efficiency, to catalysts or other chemical reagents, to pharmaceutical compositions which can thus be assimilated more readily by the human organism, to normally non-soluble or hardly soluble bodies which can thus be dissolved and thereafter obtained in the crystallized state, to graphite which thus acquires a considerable lubricating and coloring efficiency and, after being purified, washed and desiccated a detonating power when mixed with an oxidizing agent, and more generally to all materials which it is desirable to obtain in an extremely finely divided state or in solution.

With these and such other objects in view as will appear hereafter, the invention is characterized by the features that will now be fully set forth.

Broadly expounded, the decohering method according to the invention is characterized by the step of grinding, pulverizing, disintegrating the solid substances to be decohered and of submitting them to a continuous trituration or attrition process in an aqueous medium containing one or more hydrophile colloids i. e. colloidal materials having dispersive properties in aqueous media.

When the trituration or attrition process yields sufficiently fine particles, the plastic or tacky paste obtained may be either diluted in water or in an aqueous medium or diluted in a non-aqueous medium or else allowed to dry more or less completely or otherwise separated for example by centrifugation.

By diluting the paste thus obtained by trituration or attrition in an aqueous medium, the hydrophile colloid is dispersed whereby the decohered or very finely disintegrated elements may be sorted out according to their degree of fineness, the high fluidity of the medium permitting to carry out this sorting operation by decantation, by chemical, magnetic (electrophoresis) or centrifugal precipitation or by any other suitable separating process or a combination of such separating processes. The recuperation of the finest particles which are liable to remain in suspension almost indefinitely despite any separating process is effected by boiling the water off or by filtration or by a chemical, magnetic or centrifugal precipitation, or else by any other separating process or combination of said processes. As a resulting material, a sediment formed of decohered elements is obtained. The solid material which is still insufficiently disintegrated may be submitted to a further treatment whereby no appreciable quantity of said material is lost.

Assuming the attrition process to have been carried out with sufficient care, the clear aqueous liquid that is collected after all the solid elements have been sorted out still contains a certain (variable) proportion of the solid substance that was considered as substantially non-soluble in said liquid.

By desiccating the non-decanted paste or the sediment of decohered grains or elements that have been recuperated after the decantation—the desiccation being more or less complete and being preceded, accompanied or followed by an admixture of selected materials such as oil, glycerine, alcohol or such other materials as are capable of limiting the desiccation, displacing water or facilitating the miscibility of the particles in the new dispersion medium—a mass is obtained which it is only necessary triturate in the presence of a suitable dispersive agent (and eventually with the aid or heat or vacuum) to cause the decohered grains or elements to be transferred from one medium to another without its characteristics being modified. Thus for example if a pigment is treated in view of rendering it apt to the preparation of water paints, it will suffice to incorporate gum, glycerine or any other analogous material to the sediment without resorting to a previous desiccation.

By decomposing, dissolving or eliminating the colloid, the decohered elements are precipitated and become easy to purify whereby the materials can be recuperated in an extremely divided state and also in a state that is more sensitive to physical or chemical treatment and which shows more definite characteristics.

Although the scope of the invention involves the use of any hydrophile colloid or any group of such colloids, the following ones may be advantageously used, namely: gelatines including gelatine-peptones and peptonized gelatines, isinglass, egg albumens, fibrine, agar agar, gummy materials such as gum arabic, egg yolk, geloses, albuminoidal matters, hydrocelluloses, oxicelluloses, and so on.

With a view to shortening the treatment or facilitating the hydrophile constitution of the colloid or preventing it from becoming putrid or giving same more resistance to a high temperature when it is in its normal dispersion or dilution medium or better adapting it to the prevailing physical or chemical conditions or for any other reason, it may be desirable to admix the colloid in one or more batches. Further, to the colloidal medium having volumetrically expansible (swelling) or dispersive characteristics there may be added either before or after treating the substance a certain quantity of a material not capable of modifying the aqueous nature of the medium such for instance as nitric, picric, oxalic or salicylic acid, chromium salts, formaldehyde, chloral, naphthol, dyes, etc. Thus a basic or acid reaction may be imparted thereto by adding an acid or a base compound or some compound adapted to react on the medium so as to evolve an acid or a base, or else the putrefaction may be merely left to freely take place. A solid material more or less refractory to the decohering process may also be admixed for the purpose of enhancing the mechanical stresses required for decohering inasmuch as the decohering action is always due to the combined action of the solid substance and hydrophile colloid.

The expression "hydrophile colloid" which repeatedly occurs in the present specification must be construed as involving whatever colloids are capable of volumetrically expanding (swelling) or colloidally becoming dispersed in an aqueous medium whereas the expression "lyophile colloid" refers to the colloids that can expand or become dispersed in an organic medium.

In the light of this distinction, it should be noted that if such a colloid as gelatine may be regarded as "hydrophile" (in water) and "lyophile" (in glycerine) it is only involved as "hydrophile" according to the invention so far as the attrition treatment is considered but not so far as the subsequent dispersion is considered inasmuch as substances treated with hydrophile colloids can be dispersed or transferred in any normally non-dispersive medium. However, the admixture of the decohering medium and a certain proportion of an organic body in the presence of which the colloid is liable to show lyophile properties is involved in the invention insofar as said organic body does not essentially act by its solvent properties.

Without limiting the invention to any particular procedure, the following examples in which parts by weight are given illustrate preferred embodiments of the improved method for decohering solid substances and utilizing the decohered elements.

*Example I.—Preparation of graphitic mineral oil.*—The graphite to be disintegrated and decohered by the method according to the invention is advantageously disintegrated in a mixture of the following ingredients, forming an aqueous colloidal solution:

| | | |
|---|---|---|
| Gelatine | 1 part | This representing 90% of the weight of the graphite |
| Water | 20 parts | |
| Glycerine | .2 part | |

The use of an anti-putrifying agent is not always required. On the contrary, the presence of glycerine or oil seems to promote the dispersion in oil after desiccation in the atmosphere at the ambient temperature since it prevents the colloid from being completely dried up.

Obviously the glycerine, the oil or any other material having the same effect may be admixed either together with the colloid or during or at the end of the attrition process, or afterwards, or admixed to the sediment to be desiccated. Such a dilution even if the quantity of graphite treated is only equal to one gram to one liter of clear yellow oil gives a thoroughly black liquid which possesses a high lubricating power which resists heat generated in machine parts during operation particularly at high operative speeds.

*Example II.—Preparation of hydrophile paints.*—The pigments are ground or submitted to an attrition process together with a hydrophile colloid and optionally with an aseptic material or glycerine, or another material or formaldehyde or phenol. Depending on whether the pigment is to be prepared with more or less care, the sediment may first be sorted or alternatively it may be treated as it leaves the triturator or disintegrator. Finally the pigment is treated as usual with a gum syrup or any equivalent glutinous or syrupy substance as is commonly used by paint manufacturers.

*Example III.—Preparation of colored, alcohol, oil or cellulosic varnishes.*—The pigment may be treated by any one of the aforesaid processes and will in general be more or less completely desiccated and incorporated to the new medium. In certain cases, it may be advantageous to treat the pigment in an oxicellulosic or hydrocellulosic aqueous solution which, for the purpose of more readily expanding or "swelling" the colloid, may contain a certain quantity of ammoniacal copper oxide, the cellulose being thereafter converted into acetate, butyrate or nitrate of cellulose.

Thus the beginning of the process is effected in hydrophile conditions which are cheap since an aqueous medium is used while the end of it is effected in lyophile conditions, after the chemical conversion has taken place.

As aforesaid, the method according to the invention may be successfully applied to the preparation of numerous products and other illustrative examples of same might be given.

It will also be appreciated that the operative conditions of the method may vary. Thus for example the introduction of the colloid or colloids in one or several batches, the proportions of said colloids to the quantity of solid substance treated, etc. may vary to suit practical requirements. With regard to the said proportions, it should be observed however that too small a proportion of colloid does not give the decohering process enough efficiency and that, on the contrary, too large a proportion of colloid "lubricates" so to speak the substance under treatment exceedingly and offers the same disadvantage. The most suitable proportions of colloids to be employed may be empirically indicated by stating that it should when admixed to the divided solid substance to be decohered give a plastic paste which at the beginning of the operation is slightly hard and gradually becomes softer and tacky. The practical proportions for the three constituents of the paste to be treated: divided solid substance, colloid and aqueous liquid may be determined from the foregoing remarks.

All such variations are intended to be included in the scope of the subjoined claims.

As indicated in Example No. 1, the amount of hydrosil colloid should be about 4.3% of the weight of the solid substances being treated but as stated the usual range of variation of this amount is comprehended to accord with the substance treated.

What I claim is:—

1. The method of disintegrating and decohering solid substances for enabling them to be colloidally dispersed in media in which they are substantially non-soluble, comprising the step of submitting said substances in a finely divided or powdered state to continuous attrition in the presence of a protective hydrophile colloid suitably dispersed in an aqueous medium, the colloid being present in an amount of substantially 4.3% of the solid substance and having the property of thickening the mass to the desired degree during the attrition into a highly viscous paste to thereby increase the mutual triturating action of the particles of the said substances, and to effect a colloidal dispersion of some of said particles in said paste.

2. The process stated in claim 1 wherein the colloid is gelatine.

3. The process stated in claim 1 wherein the substance is powdered graphite and the colloid is gelatine.

In testimony whereof I affix my signature.

PIERRE GUSTAVE MARIE ADOLPHE PIGACHE.